United States Patent [19]

Minami

[11] Patent Number: 4,488,783
[45] Date of Patent: Dec. 18, 1984

[54] ELECTRODE STRUCTURE FOR ELECTROCHROMATIC DISPLAYS OF THE SEGMENTED TYPE

[75] Inventor: Yasuo Minami, Nara, Japan
[73] Assignee: Sharp Kabushiki Kaisha, Osaka, Japan
[21] Appl. No.: 563,888
[22] Filed: Dec. 22, 1983

Related U.S. Application Data

[63] Continuation of Ser. No. 314,422, Oct. 23, 1981.

[30] Foreign Application Priority Data

Oct. 30, 1980 [JP] Japan ............................ 55-153353

[51] Int. Cl.³ .................................................. G02F 1/17
[52] U.S. Cl. .................................................... 350/357
[58] Field of Search ........................ 350/357, 363, 353

[56] References Cited

U.S. PATENT DOCUMENTS 4,236,792 12/1980 Bissar ................................. 350/357
4,333,710 6/1982 Duchene ............................ 350/357

OTHER PUBLICATIONS

Dautremont-Smith, et al., "Electrochromic Cells with Tridium Oxide Display Electrodes", Solid State Ionics 2, No. 1, Feb. 1981, pp. 13–18.

*Primary Examiner*—James W. Davis
*Attorney, Agent, or Firm*—Birch, Stewart, Kolasch & Birch

[57] ABSTRACT

A display electrode for carrying an electrochromic material segment in an electrochromic display device is featured comprising a lead-in electrode for connecting the display electrode to a corresponding driving circuit for coloring the electrochromic material segment, and cut-off portions, not available for any interconnection, for substantially providing a uniform resistance value between the lead-in electrode and every point of the display electrode under the electrochromic material segment.

3 Claims, 2 Drawing Figures

ELECTRODE STRUCTURE FOR ELECTROCHROMATIC DISPLAYS OF THE SEGMENTED TYPE

This application is a continuation of application Ser. No. 314,422 filed on Oct. 23, 1981.

BACKGROUND OF THE INVENTION

The present invention relates to an electro-optical display containing an electrochromic material held in two electrode-carrying support plates to manifest reversible variations in the light absorption properties upon application of properly controlled voltage or current. This display is referred to as an "electrochromic display (ECD)" hereinafter.

The present invention relates, more particularly, to electrode structures connected to segment electrodes in an electrochromic display (ECD) of the segmented type.

It is well known that an ECD comprises a pair of substrates, at least one of which is transparent, a desired number of display electrodes formed on the transparent substrate, an electrochromic material film formed on the display electrodes, a counter electrode formed on at least one of the pair of substrates, and a liquid electrolyte disposed between the pair of substrates.

In such an ECD, it is preferable that an area of each of the display segments having the electrochromic material film thereon and a resistance value of a lead-in electrode connected to each of the display segments be provided such that their product was approximately constant, to provide stable visibility to some extent.

A conventional lead-in electrode resistance controlling technique was disclosed in Hiroshi Hamada et al, U.S. Pat. No. 4,153,344, issued May 8, 1979 and assigned the present assignee, entitled "LEAD-IN ELECTRODE STRUCTURE FOR ELECTROCHROMIC DISPLAYS OF THE SEGMENTED TYPE".

However, even if the product of the area of the display segment and the resistance value of the lead-in electrode connected to the display segment is unvaried, further disadvantages are likely to arise. That is, the resistance value between the lead-in electrode and certain points of the display electrode under the electrochromic material film in any one of the display segments will be different depending on the locations of these points of the display electrode, in particular, remarkably so as the area of one of the display segments is increased. Upon applying power (energy) to this particular segment, the degree of coloration over this display segment becomes disordered because the resistance values between the lead-in electrode and the points of the display electrode are changed. Therefore, stable visibility over all of the display segments can not be provided.

Therefore, it was desired that the resistance value between the lead-in electrode and every point of the display electrode under the electrochromic material film in any one of the display segments be uniform to provide for stable visibility over the display segments.

SUMMARY OF THE INVENTION

Accordingly, it is an object of the present invention to enhance the visibility in an electrochromic display of the segmented type.

It is another object of the present invention to stabilize the degree of coloration of the respective display segments included within an electrochromic display of the segmented type.

It is a further object of the present invention to provide a uniform resistance value between a lead-in electrode and every point of a display electrode under an electrochromic material film in any one of display segments.

In accordance with the present invention, a display electrode for carrying an electrochromic material segment in an electrochromic display device is provided comprising a lead-in electrode for connecting the display electrode to a corresponding driving circuit for coloring the electrochromic material segment, and cut-off portions, not available for interconnection, for substantially providing uniform resistance value between the lead-in electrode and every point of the display electrode under the electrochromic material segment.

BRIEF DESCRIPTION OF THE DRAWINGS

Other objects and novel features of the present invention are set forth in the following description and the present invention, as to its organization and its mode of operation, will best be understood from a consideration of the following detailed description of the preferred embodiments taken in connection with the accompanying drawings, wherein.

DESCRIPTION OF THE INVENTION

Figures 1, 2:
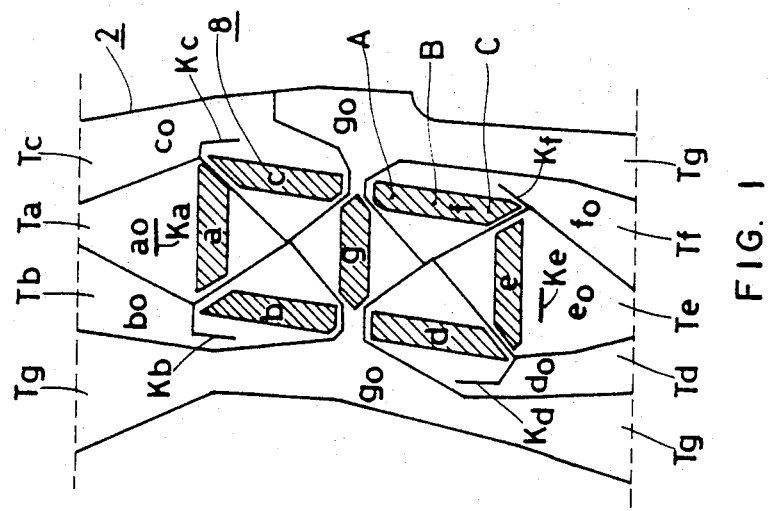
FIGS. 1 and 2 each show a plan view of display segments and display electrodes for carrying the display segments according to the present invention.

With reference to FIG. 1, one or more display digits related to the present invention comprise, preferably, some display segments a to g composed of an electrochromic material such as $WO_3$, and display electrodes a0 to g0.

The display electrodes a0 to g0 are made of a transparent, conductive film such as $In_2O_3$. They are formed on a substrate and divided from each other by narrow-lined cut-off portions. Each of these electrodes a0 to g0 includes a lead-in electrode Ta to Tg for connecting each of the display segments and an external driving circuit for coloring the display segments. A counter electrode (not shown here) is provided for confronting the display segments.

Preferably, the display segments a to g form a seven-segmented numeral pattern with selected segments having different sizes.

According to the present invention, additional narrow-lined cut-off portions ka to kf are provided within the display electrodes a0 to g0 for substantially providing a uniform resistance value between one lead-in electrode and every point of one display electrode under the electrochromic material in any one of the display segments.

Attention is directed to the segment f adjacent to which the narrow-lined cut-off portion kf is formed within the display electrode f0. The narrow-lined cut-off portion kf enables the resistance value between the lead-in electrode Tf and each of the points A to C of the display electrode f0 under the display segment f to be substantially uniform. Experiments show the following equivalence of about 640 Ω:

Between Tf and A, about 660 Ω
Between Tf and B, about 630 Ω
Between Tf and C, about 640 Ω under a resistance per square of the electrode f0 of about 120 Ω.

If the narrow-lined cut-off portion Kf is not provided, the following variety is found over the same conditions:

Between Tf and A, about 550 Ω
Between Tf and B, about 450 Ω
Between Tf and C, about 380 Ω

FIG. 2 shows another preferred embodiment wherein each of the display electrodes a0 to f0 are divided by further narrow-lined cut-off portions as indicated by $kf_1$ and $kf_2$ in the display electrode f0. The lead-in electrode Tf in the display electrode f0 is divided into three portions $Tf_1$, $Tf_2$ and $Tf_3$ respectively corresponding to the three points A, B and C. The resistance values between the point A and the portion $Tf_1$, between the point B and the portion $Tf_2$, and between the point C and the portion $Tf_3$ are substantially identical.

Therefore, the present invention enables the degree of coloration of the respective display segments included within the electrochromic display of the segmented type to be stabilized even when any one of the display segments becomes large.

The invention being thus described, it will be obvious that the same may be varied in many ways. Such variations are not to be regarded as a departure from the spirit and scope of the invention, and all such modifications are intended to be included within the scope of the following claims.

What is claimed is:
1. An electrochromic display device comprising:
two substrates,
display electrodes formed on at least one of said two substrates,
a counter electrode formed on the other of said two substrates,
electrochromic display segmented material selectively formed on said display electrodes,
lead-in electrode means for connecting each of said display electrodes to a corresponding driving circuit for driving said electrochromic display device and coloring said display segments, and
at least one non-conducting segment formed within each of said display electrodes for substantially providing a uniform or constant resistance value between said respective lead-in electrode means and substantially every point of said respective display electrode arranged beneath said corresponding electrochromic display segment material.

2. The electrochromic display device of claim 1, wherein said electrochromic material defines a multi-segmented numeral pattern, and selected segments of said electrochromic display material have different sizes.

3. The electrochromic display device of claim 1, wherein said lead-in electrode means is divided by at least one additional non-conducting segment.

* * * * *